(12) United States Patent
Carter et al.

(10) Patent No.: US 8,503,647 B2
(45) Date of Patent: Aug. 6, 2013

(54) CARRIER-IMPLEMENTED CALL EVENT DATA MANAGEMENT

(75) Inventors: David H. Carter, Mountain View, CA (US); Robert T. Brockman, Houston, TX (US); Samir B. Aragon, Cypress, TX (US)

(73) Assignee: Callbright Corporation, Houston, TX (US)

(*) Notice: Subject to any disclaimer, the term of this patent is extended or adjusted under 35 U.S.C. 154(b) by 1588 days.

(21) Appl. No.: 11/998,576

(22) Filed: Nov. 30, 2007

(65) Prior Publication Data

US 2009/0141876 A1 Jun. 4, 2009

(51) Int. Cl.
*H04M 3/42* (2006.01)
*H04M 3/00* (2006.01)
*H04M 5/00* (2006.01)

(52) U.S. Cl.
USPC ............ 379/201.02; 379/201.01; 379/265.01; 379/265.02; 379/266.1

(58) Field of Classification Search
USPC ............... 379/265.02–266.1, 265.01, 201.01, 379/201.02, 210.02
See application file for complete search history.

(56) References Cited

U.S. PATENT DOCUMENTS

| | | | |
|---|---|---|---|
| 5,309,505 A * | 5/1994 | Szlam et al. | 379/88.01 |
| 5,533,103 A * | 7/1996 | Peavey et al. | 379/69 |
| 6,707,811 B2 | 3/2004 | Greenberg et al. | |
| 6,791,974 B1 | 9/2004 | Greenberg | |
| 6,914,899 B2 | 7/2005 | Siegrist et al. | |
| 7,075,921 B2 | 7/2006 | Siegrist et al. | |
| 7,099,444 B1 * | 8/2006 | Russell | 379/142.02 |
| 7,203,188 B1 | 4/2007 | Siegrist et al. | |
| 2002/0035647 A1 * | 3/2002 | Brown et al. | 709/312 |
| 2004/0043757 A1 * | 3/2004 | Wilson | 455/413 |
| 2007/0083374 A1 * | 4/2007 | Bates et al. | 704/257 |

OTHER PUBLICATIONS

U.S. Appl. No. 10/918,715, filed Aug. 13, 2004, Crandell.
Pete Ellis, Spa Finder: Pushing All the Right Buttons, website, 2006, 2 pgs, www.eStara.com.
Marketing Sherpa Article, How Click to Call Adds Muscle to Jenny Craig's Multi-channel Strategies, website, Aug. 14, 2007, 4 pgs, www.marketingSherpa.com.
Gary Tolman, Esurance Enhance Online Experience and Improves Conversions with Click to Call Service, website, 2006, 2 pgs, www.eStara.com.
eStara: Click to Chat, website, Aug. 14, 2007, 1 pg, www.estara.com.
eStara: Click to Call, website, Aug. 14, 2007, 1 pg, www.estara.com.

(Continued)

*Primary Examiner* — Khai N Nguyen
(74) *Attorney, Agent, or Firm* — Adolph Locklar

(57) ABSTRACT

Methods and systems implemented in an information handling system are provided for managing call event data between agents and callers for calls completed through a carrier. Functionality provided by certain embodiments includes, but is not limited to, one or more of the following features: the ability to automatically update customer information databases according to call event data in real-time, dual-tone multi-frequency (DTMF) activity of the caller and/or agent, do-not-call (DNC) verification and updating, agent identification, lead source and content identification, the recording of calls, the automatic translation of voice communications to textual transcripts, key word detection, communication of customer demographic data to an agent before or during phone calls, audio file management, agent call tracking, and other functions and advantages as will be apparent with the benefit of this disclosure. Methods and systems are also included for data associated with managing broadcast campaigns.

26 Claims, 3 Drawing Sheets

OTHER PUBLICATIONS eStara: Call Tracking, website, Aug. 14, 2007, 1 pg, www.estara.com.
eStara: Products, website, Aug. 14, 2007, 1 pg, www.estara.com.
eStara: Pay Per Call, website, Aug. 14, 2007, 1 pg, www.estara.com.
eStara: Click Suite for Interactive Marketers, website, Aug. 14, 2007, 1 pg, www.estara.com.
eStara: Click Suite for Local Search, website, Aug. 14, 2007, 1 pg, www.estara.com.
eStara: Feature of the Month: Audio Clips, website, Aug. 14, 2007, 1 pg, www.estara.com.
eStara: Local Media Solutions, website, Aug. 14, 2007, 1 pg, www.estara.com.
eStara: Reduce Website Abandonment, website, Aug. 14, 2007, 1 pg, www.estara.com.
eStara: Increase Online Sales Conversions, website, Aug. 14, 2007, 1 pg, www.estara.com.
eStara: Improve Customer Loyalty, website, Aug. 14, 2007, 1 pg, www.estara.com.
eStara: Enterprise Solutions, website, Aug. 14, 2007, 1 pg, www.estara.com.
eStara: Case Studies, website, Aug. 14, 2007, 2 pgs, www.estara.com.
eStara, website, Aug. 14, 2007, 1 pg, www.estara.com.
Kevin McKenna, Continental Airlines: Continental Improves Online Sales and Reduces Web Abandonment with eStara, website, 2006, 2 pgs, www.eStara.com.
Bonita Stewart, The Chrysler Group Drives Sales and Improves Customer Satisfaction, website, 2006, 2 pgs, www.eStara.com.
Click to Chat; A Proactive Live Chat Solution for Enhanced Service, website, 2006, 1 pg, www.estara.com.
Call Tracking; A Powerful Call Tracking and Monitoring System using eStara's VoIP Technology, website, 2006, 2 pgs, www.estara.com.
Marketing Sherpa Article, How automated Alerts Increased Qualified Leads 52% & Doubled Conversions, website, Jul. 18, 2007, 3 pgs, www.marketingSherpa.com.
Carolina Robles, Spanair: Click Call Keeps Web site Visitors from Flying Solo, website, 2007, 2 pgs, www.eStara.com.

* cited by examiner

CARRIER-IMPLEMENTED CALL EVENT DATA MANAGEMENT

BACKGROUND

The present invention generally relates to methods and systems for managing call event data for calls between callers and agents accomplished though carriers. Methods and systems are also included for data associated with managing broadcast campaigns.

Aggregation of customer activities and sales data is a multi-billion dollar industry. Tracking customer marketing data is important to allow companies to serve their customers more efficiently and provide more focused services.

Examples of marketing data that may be collected relating to customers include, among others, the geographic distribution of customers, the demographic data of customers most likely to buy products and services, and the effectiveness of advertising campaigns. Other types of data that represent significant value for companies, also referred to herein as agents, include individual customer data such as a customer's identity, individual customer demographic information, the number and frequency of previous customer calls, and other past customer activity.

Companies can more effectively target their marketing and sales campaigns upon assessing the effectiveness of current and past advertising campaigns. For example, if a company determines that certain geographic regions or certain customer demographics have a much higher customer response rate to mail-out advertising campaigns, the company may more effectively target the more responsive customers when armed with such aggregated customer information.

Traditional methods of assessing responsiveness to advertising campaigns include labor-intensive efforts such as customer service representatives inquiring as to how customers heard about the company or agent, either through survey cards or verbal interrogation. Conventional methods of collecting and storing customer data and information such as customer identity, number and frequency of calls, prior customer purchases, and other relevant customer history is often collected manually by customer service representatives who input such information into a database. By requiring such data to be inputted manually, the collection of customer data is susceptible to the types of errors associated with manual entry of data and furthermore, such manual entry of data is inefficient and time-consuming.

Another problem present in the customer service and marketing industries is evaluating the effectiveness of telephone marketing campaigns. Customer service representatives often call customers or potential customers from the agent work site from a company-provided list of customer phone numbers. Direct calls to customers are often tracked when calls are made from the company site (i.e. either automatically or by manual input by a customer service representative). Sometimes, customer service representatives will print out lists of customer phone numbers to call when off-site or outside of regular business hours. One problem inherent in calling customers when agents are off-site is that calls to customers are not tracked as they would have be if the customer service representative were on-site. Thus, improved methods for tracking agent calls to customers are needed, including methods of tracking relevant marketing data associated with such agent-to-customer calls.

Another problem faced by marketers is the time lag and inefficiency inherent in conventional methods of viewing and updating customer data when receiving a call from a customer. Conventional methods involve determining the identity of a customer, which is often accomplished through verbal interrogation, and then, manually searching a database of previously-collected customer data. Then, a customer service representative usually manually updates the customer information in the database. Again, such methods are time-consuming and inefficient.

The advent of do-not-call (DNC) lists poses additional problems for marketing companies. Marketers now must verify that a customer is not on a do-not-call list before initiating a call to a customer. Conventional methods for determining whether a customer is on a do-not-call list are accomplished by manually checking a do-not-call list or database. Updating do-not-call lists and databases is also usually accomplished manually. Such manual methods of checking and updating do-not-call lists are inefficient and time-consuming.

Additionally, improved methods of reducing lead time in establishing contact with prospective customers are also needed. For example, customers often indicate an interest in products or services through e-mails or via web-based submissions. Reducing the lead time in contacting these customers increases the likelihood of a completed sale while a customer is still interested in the products and services. Waiting too long to establish contact with a customer increases the likelihood that the customer will lose interest or move on to another source for acquiring the products and services.

Thus, conventional methods of collecting and managing call event data suffer from one or more disadvantages. Other disadvantages will be apparent to one of ordinary skill in the art with the benefit of this disclosure.

SUMMARY

The present invention generally relates to methods and systems for managing call event data for calls between callers and agents accomplished though carriers. Methods and systems are also included for data associated with managing broadcast campaigns.

An example of a method implemented on an information handling system for managing call event data for caller-to-agent-by-carrier calls comprises: providing a customer information database with a plurality of customer data records wherein each customer data record comprises a plurality of caller facts, the plurality of caller facts comprising a caller identity and a customer phone number; allowing a caller to establish a first telephonic connection to a carrier wherein the caller initiates the first telephonic connection to a destination phone number from a telephonic device, the telephonic device having a caller phone number associated with the telephonic device; playing a preselected audio recording to the caller over the first telephonic connection; determining the caller phone number with a caller identification device; selecting a customer data record that has a customer phone number corresponding to the caller phone number from the customer information database; storing a call occurrence in the customer data record of the customer information database; establishing a second telephonic connection to an agent; establishing a computer network connection between the carrier and the agent; sending one or more of the caller facts to the agent via the computer network connection; allowing the first telephone connection to be in voice communication with the second telephonic connection so as to establish a telephonic connection between the caller and the agent, the telephonic connection having a call duration; and populating the customer data record with additional caller facts wherein each of the additional caller facts corresponds to one or more call events.

An example of a method implemented on an information handling system for tracking agent to customers calls comprises: providing a customer information database with a plurality of customer data records wherein each customer data record comprises a plurality of customer facts, the plurality of customer facts comprising a customer identity and a customer phone number; providing a plurality of access codes wherein each access code is associated with one of the customer phone numbers; allowing an agent to establish a first telephonic connection with a carrier; allowing the agent to transmit a first selected access code to the carrier wherein the first selected access code is one of the plurality of access codes; selecting a first customer data record that is associated with the first selected access code of one of the customer data records of the customer information database, the first customer data record being associated with a first customer phone number; establishing a second telephonic connection to the first customer phone number; allowing the first telephone connection to be in voice communication with the second telephonic connection; and populating the first customer data record of the customer information database with one or more call event facts related to the first customer phone number.

An example of a method implemented on an information handling system for communicating online user form data to an agent comprises: allowing a user to enter data on an online web site form; translating the data into an audio speech representation of the data; establishing a telephonic connection to the agent; and transmitting the audio speech representation of the data across the telephonic connection to the agent.

An example of a method implemented on an information handling system for associating audio files with a broadcast campaign comprises: establishing a computer network connection between an agent and a carrier so as to permit the agent to view a first web page served by the carrier; allowing the agent to indicate a request to be called via a telephonic connection; establishing the telephonic connection between the agent and the carrier; recording a voice communication occurring over the telephonic connection so as to produce an audio recording; and allowing the agent to associate the audio recording with an action from a plurality of actions listed on a second web page served by the carrier to the agent wherein the plurality of actions are related to the broadcast campaign.

An example of a method implemented on an information handling system for associating audio files with an audio file database comprises: establishing a computer network connection between an agent and a carrier so as to permit the agent to view a first web page served by the carrier; allowing the agent to indicate a request to be called via a telephonic connection; establishing the telephonic connection between the agent and the carrier; recording a voice communication occurring over the telephonic connection so as to produce an audio recording; and allowing the agent to associate the audio recording with an action from a plurality of actions listed on a second web page served by the carrier to the agent.

An example of an information handling system for managing call event data for caller-to-agent-by-carrier calls comprises: a carrier call server comprising a processor and a memory; wherein the carrier call server is adapted to be in communication with a plurality of telephonic connections and wherein the carrier call server is configured to receive telephonic connections from a plurality of callers; wherein the carrier call server is configured with a customer information database with a plurality of customer data records wherein each customer data record comprises a plurality of caller facts, the plurality of caller facts comprising a caller identity and a customer phone number; wherein the carrier call server is adapted to receive a first telephonic connection; wherein the carrier call server is adapted to play a preselected audio recording to the caller over the first telephonic connection; wherein the carrier call server is adapted to determine the caller phone number with a caller identification capability; wherein the carrier call server is adapted to select a customer data record that has a customer phone number corresponding to the caller phone number from the customer information database; wherein the carrier call server is adapted to store a time-date stamp in the customer data record of the customer information database; wherein the carrier call server is adapted to establish a second telephonic connection to an agent; wherein the carrier call server is adapted to establish a computer network connection between the carrier and the agent; wherein the carrier call server is adapted to sent one or more of the caller facts to the agent via the computer network connection; wherein the carrier call server is adapted to allow the first telephone connection to be in voice communication with the second telephonic connection so as to establish a telephonic connection between the caller and the agent, the telephonic connection having a call duration; and wherein the carrier call server is adapted to populate the customer data record with additional caller facts wherein each of the additional caller facts corresponds to one or more call events that occur during the call duration.

The features and advantages of the present invention will be apparent to those skilled in the art. While numerous changes may be made by those skilled in the art, such changes are within the spirit of the invention.

BRIEF DESCRIPTION OF THE DRAWINGS

A more complete understanding of the present disclosure and advantages thereof may be acquired by referring to the following description taken in conjunction with the accompanying figures, wherein.

Figure 1:
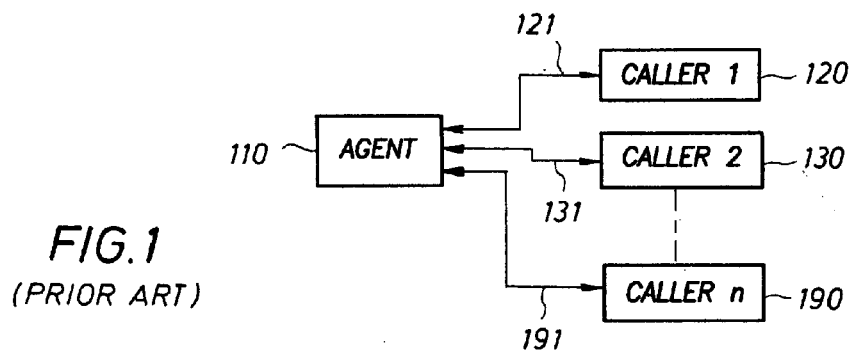
FIG. 1 illustrates a schematic diagram showing direct caller-to-agent and agent-to-caller calls.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF PREFERRED EMBODIMENTS

The present invention generally relates to methods and systems for managing call event data for calls between callers and agents accomplished though carriers. Methods and systems are also included for data associated with managing broadcast campaigns.

Methods and systems implemented in an information handling system are provided for managing call event data between agents and callers for calls that are completed through a carrier. Functionality provided by certain embodiments includes, but is not limited to, one or more of the following features: the ability to automatically update customer information databases according to call event data in real-time, detection and logging of dual-tone multi-frequency (DTMF) activity of the caller and/or agent, do-not-call (DNC) verification, recording of calls, automatic translation and storing of voice communications to textual transcripts, communication of customer demographic data to an agent before or during phone calls, agent identification, lead source and content identification, key word detection, and other functions and advantages as will be apparent with the benefit of this disclosure.

To facilitate a better understanding of the present invention, the following examples of certain embodiments are given. In no way should the following examples be read to limit, or define, the scope of the invention.

FIG. 1 illustrates a schematic diagram showing direct caller-to-agent and agent-to-caller calls. Agent 110 is any entity or company that offers products and services. Callers 120, 130, and 190 are potential customers or clients of agent 110. In certain embodiments, callers may initiate telephonic connections with agents, whereas in other embodiments, agents may initiate telephonic connections with callers. The term "caller" as used herein in no way requires that the caller initiate the telephonic connections described herein.

Callers 120, 130, and 190 contact agent 110 directly through traditional telephone lines 121, 131, and 191. Alternatively, agent 110 may directly initiate calls to callers 120, 130, and 190. Telephone lines 121, 131, and 191 are traditional phone lines of a public switched telephone network (PSTN).

In this conventional scenario, agent 110 may be initiating contact with callers 120, 130, and 190 for a variety of reasons, including following-up with previous sales inquiries from callers 120, 130, and 190 or contacting callers 120, 130, and 190 in accordance with a cross-selling promotion. In some instances, callers 120, 130, and 190 may be responding to an television, radio, Internet, or print advertisement inviting customers to call agent 110.

In this conventional scenario, no automated means exist for tracking the occurrence of calls between agents and callers. Furthermore, no automated means exist for tracking activities that take place during the call, referred to herein as "call events." Accordingly, such conventional methods typically employ customer service representatives who must manually record call occurrences and call event data. Such manual entry is susceptible to a variety of errors including at times omitted data when a customer service representative fails to properly input data. Erroneous and omitted data affects the ability of a company or agent to properly interpret and draw conclusions from the collected data. Accordingly, manual methods of tracking call occurrences and call event data are deficient in that they fail to accurately track such data.

Additionally, conventional direct PSTN telephone communication between callers and agents lack automated tracking mechanisms for determining and tracking the referral sources of telephone calls. Determining the referral sources of calls is important for, among other reasons, assessing the effectiveness of different advertising campaigns. For example, if an agent uses several simultaneous advertisements (e.g. a print advertisement in a magazine, a web-site advertisement, and a radio advertisement), the agent will likely want to know how many phone inquiries each advertisement generated and among other information, which potential customers responded to the advertisements, the demographics and characteristics of the customers, and the geographic distribution of the customers responding. Unfortunately, conventional methods of direct PSTN telephone communication between callers and agents lack automated mechanisms to track this sort of information.

Figure 2:
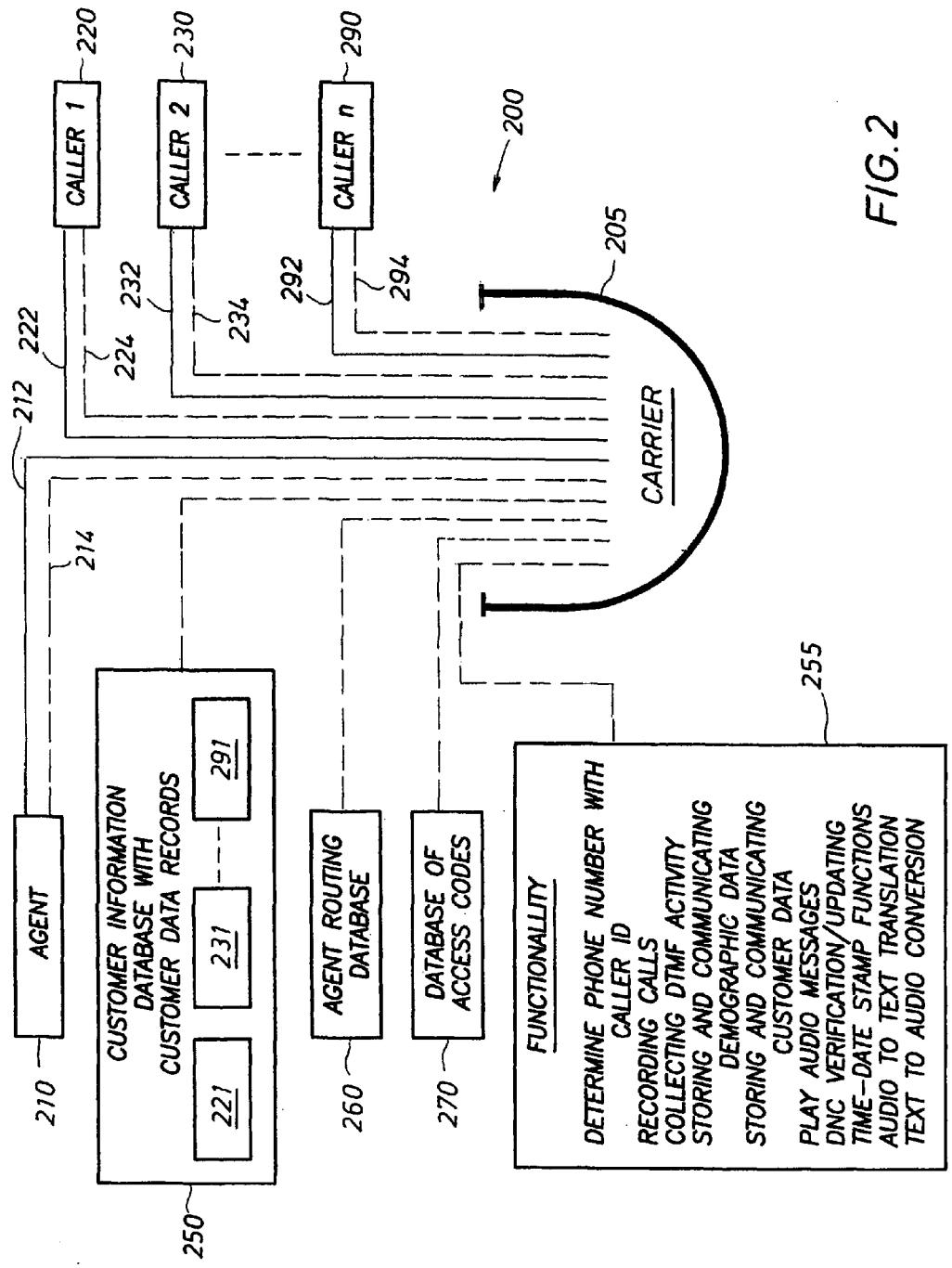
FIG. 2 illustrates a schematic diagram showing caller/agent by carrier calls, the carrier providing call tracking and data management functionality in accordance with one embodiment of the present invention.

FIG. 2 illustrates a schematic diagram showing caller/agent by carrier calls, the carrier providing additional call tracking and data management functionality. Here, communications between agent 210 and callers 220, 230, and 290 are routed through carrier 205. Carrier 205 is a third-party facilitator of communications between agents and callers.

The calls placed through carrier 205 to agent 210 may be transparent to callers 220, 230, and 290 such that callers 220, 230, and 290 are unaware that a telephonic connection is being routed through carrier 205 to reach the agent 210. As one example of a caller-to-agent-by-carrier call, caller 220, in response to a print advertisement, may attempt to establish a telephonic connection to agent 210 by dialing, through a traditional PSTN, a phone number indicated in an advertisement. The phone number in the advertisement is actually a phone number established for the benefit of agent 210 that directs caller 220 to carrier 205 through telephonic connection 222.

Upon establishment of telephonic connection 222, carrier 205 determines the phone number of caller 220 through caller identification techniques. Knowing a customer's phone number enables carrier 205 to search customer information database 250 for customer data records associated with the customer's phone number. In this way, carrier 205 identifies the identity of caller 220 and the history associated with the previous calls of caller 220. Additionally, carrier 205 may update customer information database 250 with a time-date stamp corresponding to the present call or with other data indicating the call occurrence.

Simultaneously or soon thereafter, carrier 205 establishes telephonic connection 212 to agent 210. Before or while establishing telephonic connection 212, carrier 205 may play a prerecorded audio message or series of messages to caller 220 and/or to agent 210. Suitable audio messages include, but are not limited to, information such as "Your call may be recorded for quality assurance purposes." Suitable audio messages to the agents include, but are not limited to, source referral notifications (also known as lead source or source identifiers), such as for example, "Call coming from Yellow Pages." Knowing the lead source for a call can aid the agent in determining the probable reason for a caller's call. Any number of additional informative messages may be included. Other audio messages include advising the agent of the advertisement content of the lead source, sometimes referred to as lead content.

Additionally, caller 220 may be presented with a variety of options, which allow or require selection among a number of options by caller 220, either by dual-tone multi-frequency (DTMF) activity by caller 220 or by a voice indication by caller 220. Suitable examples of choices presented to caller 220 include, but are not limited to, "Press 1 for Sales, Press 2 for Service, Press 3 for the Body Shop, Press 9 to be added to our 'Do-Not-Call' List, etc." In certain embodiments, such options allow carrier 205 to route the call of caller 220 to the appropriate destination at agent 210. In preferred embodiments, the delay caused by the routing of telephonic connections 222 and 212 is minimized so as to make the telephonic connection from caller 220 to agent 210 appear as transparent as possible.

Any touch-tone activity of caller 220 may be detected by carrier 205 and optionally stored in customer information database 250 in the relevant customer data record corresponding to caller 220.

Customer information database 250 contains customer data records 221, 231, and 291, which in some embodiments, include customer identity information, customer phone number(s), previous call occurrences by each customer, past sales information of each customer, amount spent during a previous time period by each customer, frequency of calls by each customer, customer demographic information, and any other myriad of individual and aggregate customer data useful for marketing purposes. Customer information database 250 may include information collected from other third-party providers as desired. The information or data stored in each customer data record 221, 231, and 291 is referred to herein as "caller facts." In certain embodiments, customer information database 250 may be updated or added to on-the-fly as call events or call activity occur in real-time.

Computer network connection 214 is established between carrier 205 and agent 210. Computer network connection 214 may be any network connection suitable for sharing data between carrier 205 and agent 210, including but not limited to wireless connections and Internet connections. Before or during the telephonic connection between caller 220 and agent 210 (established through carrier 205), carrier 205 may send one or more caller facts to agent 210.

Agent 210 receives the one or more caller facts, which may be used to provide agent 210 more focused customer service to caller 220. For example, in certain embodiments, a unique phone number may be associated with a particular print advertisement. Carrier 205, upon detecting the unique phone number, which has been dialed, may alert agent 210 of this fact so that agent 210 will know that caller 220 is calling in reference to the particular print advertisement. Other examples of facts potentially useful to agent 210 include, but are not limited to, the fact that caller 220 is already a customer of agent 210 or that caller 220 is a frequent caller to agent 210. It is explicitly recognized that any of the audio messages to the agent contemplated herein may also be transmitted to agent 210 via computer network connection 214 in lieu of the audio messages or in combination with the audio messages.

In addition to communicating customer data records 221, 231, and 291 to agent 210 and updating customer data records 221, 231, and 291, carrier 205 may provide other optional functionality. Examples of additional functionality provided by carrier 205 include, but are not limited to, do-not-call (DNC) verification/updating, recording calls, storing recorded calls in customer information database 250, translating voice communications to textual transcripts, storing the textual transcripts in customer information database 250, detecting the presence of key words (also known as trigger words), detection and storing of agent and caller disconnections (e.g. time and number of disconnections), detecting and storing agent identification (e.g. which agent talked to which caller when), detection and storing of agent answering call data (e.g. which agent answered which calls, or any combination thereof.

DNC verification/updating allows an agent or a customer to indicate their desire to be added to the agent's DNC list. In certain embodiments, agent 210 or caller 220 indicates the desire of caller 220 to be added to the agent's DNC list through DTMF activity. Carrier 205 detects the particular DTMF activity that corresponds to a DNC request. Customer data record 221, which in this example happens to correspond to caller 220, is then updated to indicate that caller 220 is on the agent's DNC list.

Any call placed through carrier 205 may be recorded and the recorded voice communication may be stored in customer information database 250, and if desired, associated with the relevant customer data record 221, 231, and 291. Each recorded voice communication may be automatically translated using speech-to-text algorithms as desired. The resulting textual transcripts may also be stored in customer information database 250. The resulting textual transcripts may be searched or mined for certain key words or flags as desired as to each individual customer or on an aggregated basis of all customers.

During the telephonic connection between agent 210 and caller 220 (through carrier 205), caller 220 may be presented with an automated questionnaire or survey. Alternatively, caller 220 may be presented with an automated questionnaire or survey after disconnection of telephonic connection 212, so as to leave telephonic connection 222 between carrier 205 and caller 220 active or otherwise intact. During the questionnaire or survey, caller 220 may be invited to indicate responses, either through voice responses or DTMF activity. The responses may be recorded or logged by carrier 205 and added to customer information database 250 and if desired, associated with the relevant customer data record.

Examples of suitable surveys include customer quality surveys (e.g. "How would you rate the overall quality of your customer service provider from a scale of 1 to 5?" or "How soon do you anticipate purchasing your next vehicle?"). This information may then be added to customer information database 250 and if desired, associated with the relevant customer data record.

While the methods heretofore described refer to caller initiated calls, any of the above functionality may be provided for agent-initiated calls as well. Accordingly, agent 210 may initiate telephonic connection 212 to carrier 205, who then establishes, for example, telephonic connection 232 to caller 230. Again, any of the aforementioned functionality may be provided through agent-to-caller-by-carrier calls, including, but not limited to, DNC verification/updating, recording and storing voice communications, translating voice communications to textual transcripts and storing the transcripts, detection and storing of key word occurrences, detection and storing of agent and caller disconnections (e.g. time and number of disconnections), detecting and storing agent identification, detection and storing of agent answering call data, detection and storing of DTMF activity of the caller or the agent, or any combination thereof.

Agent initiated calls to callers may occur on an ad-hoc basis or as a coordinated marketing campaign. Where customer service representatives are calling from the agent's on-site facilities through carrier 205, call events may be collected and recorded by any of the aforementioned methods. Occasionally, however, customer service representatives may wish to place calls to one or more of callers 220, 230, and 290 from phones that are not automatically configured to route through carrier 205. If customer service representatives of agent 210 place calls directly to one or more of callers 220, 230, and 290 through telephonic connections that are not routed through carrier 205 (e.g. by home phones or mobile phones of the customer service representatives themselves), the occurrences of the calls and call events would normally not be collected and recorded in customer information database 250.

Accordingly, to record call occurrences and to retain the benefit of other functionality available when calls are placed through carrier 205, a plurality of access codes 270 may be generated wherein each access code corresponds to a customer phone number. Customer service representatives may then call carrier 205 directly and enter one or more access codes to be connected to the corresponding customers associated with each access code. In this way, access codes 270 allow carrier 205 to establish telephonic connections to individual callers. Additionally, access codes 270 allow identification of the customer data record associated with a particular caller or customer. Accordingly, the aforementioned functionality may be provided for agent calls placed through a carrier with access codes corresponding to individual customers, including, but not limited to, DNC verification/updating, storing of call occurrences, determining and storing call duration data, recording and storing voice communications, translating voice communications to textual transcripts and storing the transcripts, detection and storing of DTMF activity of the caller or the agent, or any combination thereof.

In addition to providing a mechanism for notifying carrier 205 of which customer to contact, plurality of access codes 270 may also serve to mask customer phone numbers from customer service representatives to protect the privacy of customers.

In certain embodiments, plurality of access codes 270 is created by application of a mathematical algorithm that maps customer phone numbers to access codes, wherein each access code corresponds to a unique customer phone number. In other embodiments, a one-to-one mapping between customer phone numbers and access codes will be generated by an arbitrary pairing of customer phone numbers and access codes, which in some cases, may include random number generation in whole or in part. By pairing customer phone numbers and access codes with a one-to-one arbitrary mapping, access codes may be "expired." That is, once a code is used once or for a predesignated number of times, carrier 205 can prevent usage of the access code from being used again. In this way, repeated calls to the same customer from a list or lists of access codes is prevented. This feature may also be useful to prevent calls to the same customer from two different customer service representatives operating from the same list of access codes.

Other functionality provided by carrier 205 includes text to audio conversion. Callers 220, 230, and 290 may communicate with carrier via computer network connections 224, 234, and 294. In certain embodiments, computer network connections 224 may be an Internet connection between one or more of callers 220, 230, and 290 and a web server. For example, caller 230 may access a web page and submit a form comprising textual data, multiple-choice data, and other form data through the Internet via computer network connection 234. Alternatively, caller 230 may submit textual information in the form of an e-mail. Carrier 205 then translates the textual and form data into an audio speech representation of the data. Subsequently, carrier 205 establishes a telephonic connection 212 to agent 210 and plays the audio speech representation of the data to agent 210 through telephonic connection 212. In preferred embodiments, the delay between the submission of form data by caller 220 and playing the audio speech representation of the data is either immediate or minimized. In certain embodiments, the delay is less than ten seconds.

After playing the audio speech representation of the data to agent 210, agent 210 may optionally automatically establish a telephonic connection to caller 220 with DTMF activity or other speech commands. Minimizing the delay between the submission of form data by caller 220 and playing the translated speech communication is advantageous in certain embodiments in that agent 210 is apprised of the submission of the form data by caller 220 quickly after its submission. Minimizing the delay in contacting potential customers allows agent 210 the opportunity to promptly contact caller 220 before caller 220 loses interest in seeking products and services from agent 210 or finds the products and services from another provider.

Another feature which may be provided by carrier 205 is destination phone number routing to an agent using an agent routing database. Agent routing database 260 comprises a list of telephonic destinations at agent 210 and a set of criteria for determining the routing of telephonic connections to customer service representatives at agent 210. For example, agent routing database 260 could instruct carrier 205 to route all calls at a certain time of day to a certain customer service representative or representatives. Alternatively, agent routing database 260 could instruct carrier 205 to route all callers having certain demographics to a particular customer service representative or representatives. In yet another example, agent routing database 260 may be configured to instruct carrier 205 to route all callers with a high call frequency to yet another customer service representative or representatives. Indeed, any data in customer information database 250 may be used for criteria to determine destination routing of calls to agent 210. One example of suitable criteria for routing calls includes routing a call to a cashier instead of to a service advisor when work on a customer's car at a dealership has been completed. In this scenario, when the customer's paperwork is with a cashier and no longer with a service advisor, efficiency may dictate that a customer is more efficiently served by first being routed to a cashier when the customer's car is ready to be picked up. Other suitable examples include routing a particular customer to the sales associate who has previously assisted the customer (e.g. with a test drive of a vehicle at a dealership). In this way, customers may receive more personalized service.

Additional optional steps may include generating one or more reports that include a presentation of data from customer information database 250 on an individual or aggregate basis to agent 210.

Figure 3:
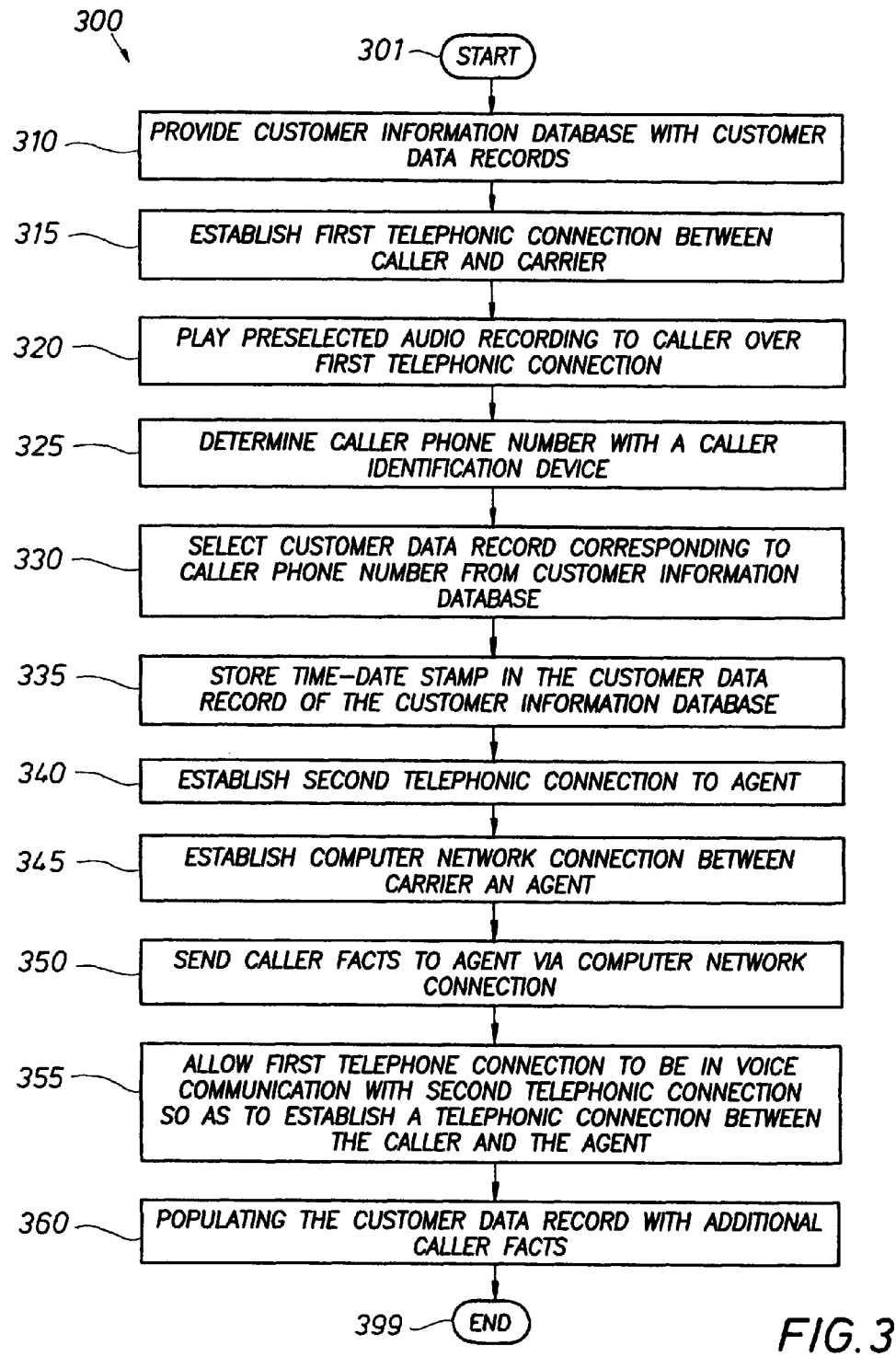
FIG. 3 illustrates a flowchart showing an example of a method implemented on an information handling system for managing call event data for caller/agent by carrier calls in accordance with one embodiment of the present invention.

FIG. 3 illustrates a flowchart showing an example of a method implemented on an information handling system for managing call event data for caller/agent by carrier calls. Method 300 commences at step 301. In this embodiment, a customer information database is provided with customer data records in step 310. It is explicitly recognized that customer information database may physically reside at carrier 305, agent 310, at any representative or agent of carrier 305 or agent 310, or any combination thereof. Each customer data record comprises caller facts, such as a caller identity and a customer phone number. Other caller facts could include, but are not limited to, caller demographic information, the destination phone number, caller frequency, a time-date stamp of one or more previous calls by the caller, previous agent identifications (e.g. who the caller spoke to previously), previous key word occurrences, previous DTMF activity of the caller or agent during previous calls, previous disconnection activity, or any combination thereof. It is explicitly recognized that the term "caller facts" as used herein is not limited to the facts or facts about the caller. The term "caller facts" refers to any data in customer data record corresponding to or associated with a particular caller. Indeed, "caller facts," in certain embodiments, may comprise opinions and/or facts relating to a particular caller or to a call made by or to a particular caller.

In step 315, a caller establishes a first telephonic connection to a carrier. The first telephonic connection is initiated by the caller placing a call to a destination phone number from a telephonic device. The caller may use any device suitable for establishing telephonic connections, including, but not limited to, mobile phones, fixed phones, VoIP protocols over a computer network connection, or any combination thereof.

In step 320, an optional preselected audio recording may be played to the caller over the first telephonic connection. In certain embodiments, the preselected audio recording may be tailored to each caller or to groups of callers depending on the caller facts associated with each caller. In other embodiments, the preselected audio recording varies according to DTMF activity of caller 320.

In step 325, the caller phone number is determined with a caller identification device or capability. Then, in step 330, a customer data record is selected that contains a customer phone number corresponding to the caller phone number from the customer information database. The term "customer data record" as used herein refers to any record or instance of data in customer information database 250 that corresponds to or is associated with a particular caller or customer.

In step 335, the occurrence of the call is stored in the customer data record of the customer information database. The terms "store, storing, and stored" and variations thereof, as used herein, refer to the act of writing, placing, or putting data in a customer information database. These terms include the act of adding to and updating a customer information database with data. The call occurrence may be a time-date stamp in certain embodiments or data from which a time-date stamp may be derived. In certain embodiments, the call occurrence is simply a count of how many times a call has occurred during a specified time period.

In step 330, a second telephonic connection is established to an agent. The telephonic connection may be established through any suitable audio communication link, including, but not limited to, standard PSTN connections, VoIP protocols over a computer network connection, or any combination thereof.

In step 345, a computer network connection is established between the carrier and the agent. This step may be performed at any time during method 300. Step 350 shows one or more caller facts being sent to the agent via the computer network connection. The computer network connection may be any suitable network connection including, but not limited to, an Internet connection, a wireless connection, or any combination thereof. As described earlier, caller facts could include, but are not limited to, caller demographic information, caller identity information, a customer phone number, the destination phone number, caller frequency, a time-date stamp of one or more previous calls by the caller, or any combination thereof. Transmitting to agent 310 one or more of these caller facts corresponding to caller 320 may be useful to agent 310 in providing more focused or efficient service to caller 320. It is explicitly recognized that step 350 could occur before step 355, after step 355, any time during method 300, or any combination thereof.

In step 355, the first telephone connection is placed in voice communication with the second telephonic connection so as to establish a telephonic connection between the caller and the agent. In step 360, the customer data record is populated or otherwise updated with additional caller facts wherein each of the additional caller facts corresponds to one or more call events. Additional caller facts may include any suitable call event data including, but not limited to, the destination phone number, the caller's origination phone number, caller frequency, a time-date stamp of one or more previous calls by the caller, agent identification(s) (e.g. identification of the agent to whom the caller is speaking), key word occurrences during the call, DTMF activity of the caller or agent during the call, disconnection activity of the agent or caller, or any combination thereof. It is explicitly recognized that step 360 may occur in real-time as call events occur, after termination of the telephonic connection, or any combination thereof. Method 300 ends at step 399.

Figure 4:
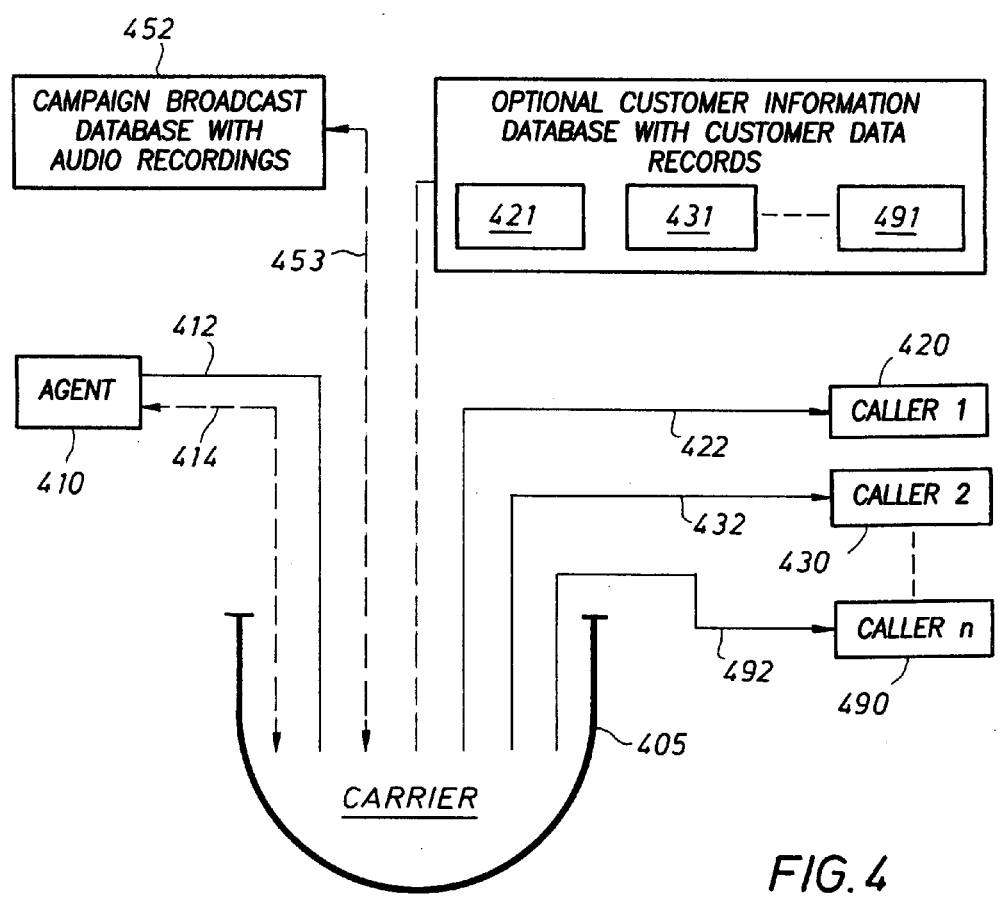
FIG. 4 illustrates a schematic diagram showing telephone and data connectivity between an agent and one or more callers through a carrier, illustrating a variety of functionality in accordance with one embodiment of the present invention.

FIG. 4 illustrates a schematic diagram showing telephone and data connectivity between an agent and one or more callers through a carrier, illustrating a variety of functionality, including methods for associating audio files with broadcast campaigns.

Computer network connection 414 is established between agent 410 and carrier 405 so as to permit agent 405 to access or view web pages served by carrier 405 or a representative of carrier 405. In certain embodiments, agent 410 accesses software for configuration of an audio broadcast campaign or campaigns. A broadcast campaign refers to any automated dialing of customer phone numbers in which prerecorded messages are played to answering customers. During the prerecorded messages, customers may be invited to respond with either speech input or with DTMF activity (e.g. "Press '1' to be connected to a customer service representative").

The audio messages that are played to each customer may vary depending on the customer's responses or any other caller information such as the caller demographics, the past sales history of the customer, etc. Usually, the options presented to customers follow a predetermined decision tree associated with each broadcast campaign. Traditionally, the association of audio recordings with various broadcast campaign decision trees is handled via a touch-tone interface of a standard telephone, which requires a customer service representative to navigate through a large number of audio menus by DTMF activity of the agent. Managing the potentially large array of audio recordings associated with broadcast campaigns can quickly become quite cumbersome for decision trees of modest complexity and for multiple broadcast campaigns.

Accordingly, the configuration software accessed via computer network connection 414 by agent 410 allows agent 410 to update campaign broadcast database 452 with a plurality of audio recordings. Telephonic connection 412 is established between agent 410 and carrier 405 to allow recording of one or more audio recordings. In preferred embodiments, agent 410 uses a click-to-call feature of the configuration software of carrier 405 to initiate telephonic connection 412. Agent 410 is then given the opportunity to record a voice communication occurring over the telephonic connection so as to produce one or more audio recordings. Campaign broadcast database 452 with audio recordings 452 comprises records which associate audio recordings with a campaign broadcast decision tree or a plurality of actions illustrated on the configuration software, which in this embodiment, is viewed by agent 410 over computer network connection 414. Agent 410 then updates campaign broadcast database 452 so as to associate the audio recording with a portion of the campaign broadcast decision tree.

Campaign broadcasts to callers 420, 430, and 490 may then be initiated over telephonic connections 422, 432, and 492 in series, in parallel, or any combination thereof. Audio recordings are played to answering callers. Depending on the responses of callers 420, 430, and 490, different audio recordings may be played to each caller according to customer data records 421, 431, and 491 stored in campaign broadcast database 452.

It is explicitly recognized that any sequential presentation herein of steps does not imply a chronological order of steps except where such order is explicitly stated or inherently required by the methods described herein. Indeed, the steps for all methods described herein may occur in any order and continue during the occurrence of other steps unless explicitly stated otherwise or unless another sequence or timing is inherently required by the method.

Additionally, in those embodiments in which a customer, caller, or agent is presented with web pages, although the some embodiments may anticipates that a carrier may serve the web pages themselves, it is explicitly recognized that a carrier may choose to outsource webserver hosting or webserver and remittance processing to an outside company on behalf of the carrier. The service to callers, customers, and agents would be provided so that the individual accessing the web pages would not normally be aware that the carrier or agent was not actually serving the web pages directly. Thus, the phrase "web page(s) served by the carrier" explicitly includes web page(s) served on behalf of the carrier.

It is explicitly recognized that one or more methods of the present invention may be implemented via an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU or processor) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. A method implemented on an information handling system for managing call event data for caller-to-agent-by-carrier calls comprising:
   providing a customer information database with a plurality of customer data records wherein each customer data record comprises a plurality of caller facts, the plurality of caller facts comprising a caller identity and a customer phone number;
   receiving a phone call from a caller at a destination phone number and generating a first telephonic connection with that caller;
   playing a preselected audio recording to the caller over the first telephonic connection;
   determining the caller phone number with a caller identification device;
   selecting a customer data record from the customer information database corresponding to the caller phone number;
   storing a call occurrence in the customer data record of the customer information database;
   generating a second telephonic connection with an agent;
   generating a computer network connection with the agent;
   sending one or more of the caller facts to the agent via the computer network connection;
   establishing voice communication between the caller and the agent, the voice communication having a call duration; and
   populating the customer data record with additional caller facts wherein each of the additional caller facts corresponds to one or more call events that occurs during the call duration.

2. The method of claim 1 further comprising detecting a dual-tone multi-frequency (DTMF) activity of the caller before the step of generating a second telephonic connection to an agent; and
   wherein the step of detecting DTMF activity occurs before updating the customer data record of the customer information database with DTMF data representing the DTMF activity of the caller.

3. The method of claim 1 further comprising detecting a DTMF activity of the agent corresponding to a do-not-call (DNC) request; and updating the customer data record of the customer information database with a do-not-call flag.

4. The method of claim 1 wherein the step of populating the customer data record with additional caller facts occurs substantially simultaneously with each of the one or more call events.

5. The method of claim 1 wherein the step of populating the customer data record with additional caller facts occurs after a disconnection of the first telephonic connection and wherein the step of storing the call occurrence occurs after the step of generating the second telephonic connection to the agent.

6. The method of claim 4 wherein the computer network connection is an Internet connection and wherein the one or more call events occur during the call duration.

7. The method of claim 1 further comprising before establishing voice communication between the caller and the agent, transmitting a source identification over the second telephonic connection to the agent wherein the source identification is an identifier that corresponds to the destination phone number.

8. The method of claim 1 wherein the call occurrence is a time-date stamp that corresponds to one of the following: a commencement time of the voice communication, a termination time of the voice communication, or both a commencement time and a termination time of the telephonic connection.

9. The method of claim 1 wherein the step of sending one or more of the caller facts to the agent via a computer network connection occurs, at least in part, during the call duration.

10. The method of claim 1 further comprising displaying a live console interface on a computer display device to the agent that displays one or more of the caller facts to the agent.

11. The method of claim 10 further comprising updating the live console interface to reflect one or more of the additional caller facts that occur during the call duration.

12. The method of claim 1 further comprising receiving a DNC request via the computer network connection and updating the customer data record of the customer information database so as to identify the caller as a do-not-call caller or a DTMF activity of the agent.

13. The method of claim 5 wherein the plurality of caller facts comprises one or more of caller demographic information, caller identity information, the customer phone number, the destination phone number, caller frequency, a time-date stamp of one or more previous calls by the caller, or any combination thereof.

14. The method of claim 5 wherein the one or more call events comprises one or more of caller DTMF activity detected during the call duration, agent DTMF activity detected during the call duration, the initiation of a call to a particular destination phone number, the detection of agent identification, or any combination thereof.

15. The method of claim 1 further comprising recording the voice communication between the caller and the agent and storing the recorded voice communication in the customer data record of the customer information database.

16. The method of claim 15 wherein the step of recording commences upon detecting a particular DTMF activity of the agent.

17. The method of claim 1 further comprising translating the voice communication to a textual transcript and storing the textual transcript in the customer data record of the customer information database.

18. The method of claim 17 further comprising detecting an occurrence of one or more trigger words and storing the occurrence in the customer data record.

19. The method of claim 15 further comprising translating the voice communication from an audio speech to a textual transcript and storing the textual transcript in the customer data record of the customer information database.

20. The method of claim 1 wherein the first telephonic connection occurs over a public switched telephone network (PSTN).

21. The method of claim 20 wherein the second telephonic connection occurs over a Voice over Internet Protocol (VoIP) connection.

22. The method of claim 1 further comprising providing a routing database wherein the routing database comprises a plurality of routing agent phone numbers and wherein the step of generating the second telephonic connection with the agent comprises the steps of selecting a routing agent phone number from the routing database according to a set of selection criteria and establishing the second telephonic connection to the selected routing agent phone number.

23. The method of claim 22 wherein the step of selecting the routing agent phone number is accomplished according to criteria contained in the routing database that specify which routing number should be used under the criteria.

24. The method of claim 1 wherein the preselected audio recording varies according to the caller facts.

25. The method of claim 1, wherein the customer data record is populated by a carrier call server of the information handling system that is configured to populate the customer data record with the additional caller facts.

26. An information handling system for managing call event data for caller-to-agent-by-carrier calls comprising:
  a carrier call server comprising a processor and a memory;
  wherein the carrier call server is configured to be in communication with a plurality of telephonic connections and wherein the carrier call server is configured to receive telephonic connections from a plurality of callers;
  wherein the carrier call server is configured with a customer information database with a plurality of customer data records wherein each customer data record comprises a plurality of caller facts, the plurality of caller facts comprising a caller identity and a customer phone number;
  wherein the carrier call server is configured to receive a first telephonic connection;
  wherein the carrier call server is configured to play a preselected audio recording to the caller over the first telephonic connection;
  wherein the carrier call server is configured to determine the caller phone number with a caller identification capability;
  wherein the carrier call server is configured to select a customer data record that has a customer phone number corresponding to the caller phone number from the customer information database;
  wherein the carrier call server is configured to store a time-date stamp in the customer data record of the customer information database;
  wherein the carrier call server is configured to establish a second telephonic connection to an agent;
  wherein the carrier call server is configured to establish a computer network connection between the carrier and the agent;
  wherein the carrier call server is configured to send one or more of the caller facts to the agent via the computer network connection;
  wherein the carrier call server is configured to allow the first telephone connection to be in voice communication with the second telephonic connection so as to establish a telephonic connection between the caller and the agent, the telephonic connection having a call duration; and
  wherein the carrier call server is configured to populate the customer data record with additional caller facts wherein each of the additional caller facts corresponds to one or more call events that occur during the call duration.

* * * * *